United States Patent [19]

Warden et al.

[11] Patent Number: 4,580,770

[45] Date of Patent: Apr. 8, 1986

[54] SHEET FEEDING APPARATUS AND METHOD

[75] Inventors: Gerald D. Warden; Kenneth A. Hams, both of Easton, Pa.

[73] Assignee: Bell & Howell Company, Allentown, Pa.

[21] Appl. No.: 692,454

[22] Filed: Jan. 18, 1985

[51] Int. Cl.$^4$ .................. B65H 39/02; B65H 1/16
[52] U.S. Cl. .................. 270/58; 271/11; 271/5; 271/155; 271/96; 271/110; 271/112
[58] Field of Search .................. 270/58; 271/5, 11–12, 271/90, 94, 96–97, 109–110, 112, 154–155; 209/564

[56] References Cited

U.S. PATENT DOCUMENTS

| | | | |
|---|---|---|---|
| 4,052,051 | 10/1977 | Mersereau et al. | 271/155 |
| 4,324,394 | 4/1982 | Mitzel et al. | 271/5 |
| 4,421,306 | 12/1983 | Muka | 271/5 |
| 4,524,691 | 6/1985 | Miller | 271/11 |

Primary Examiner—E. H. Eickholt

Attorney, Agent, or Firm—Griffin, Branigan, & Butler

[57] ABSTRACT

Sheets are fed from the top of a stack (12) by a continuously rotating vacuum wheel (40). After the leading edge of a just-fed sheet is detected, a control circuit (110) de-energizes valve means (92) whereby the wheel (40) is effectively disconnected from a source of vacuum (90). Indicia borne on the just-fed sheet is read using a probe (23). If the indicia indicates that the just-fed sheet is related for grouping purposes to previously-fed sheets, the control circuit (110) energizes valve means (92) whereby vacuum is applied to the wheel (40) for the feeding of a further sheet. If the indicia indicates that the just-fed, just-read sheet is not related to previously-fed sheets, the control circuit (110) does not energize the valve means (92) for the feeding of a further sheet until the control circuit (110) receives an indication that all previously-fed sheets have been grouped and discharged onto an insert track (32). The valve means (92) comprises two electrically-actuated solenoid valves (94, 96) connected in parallel between the source of vacuum (90) and a vacuum transfer block (42).

14 Claims, 5 Drawing Figures

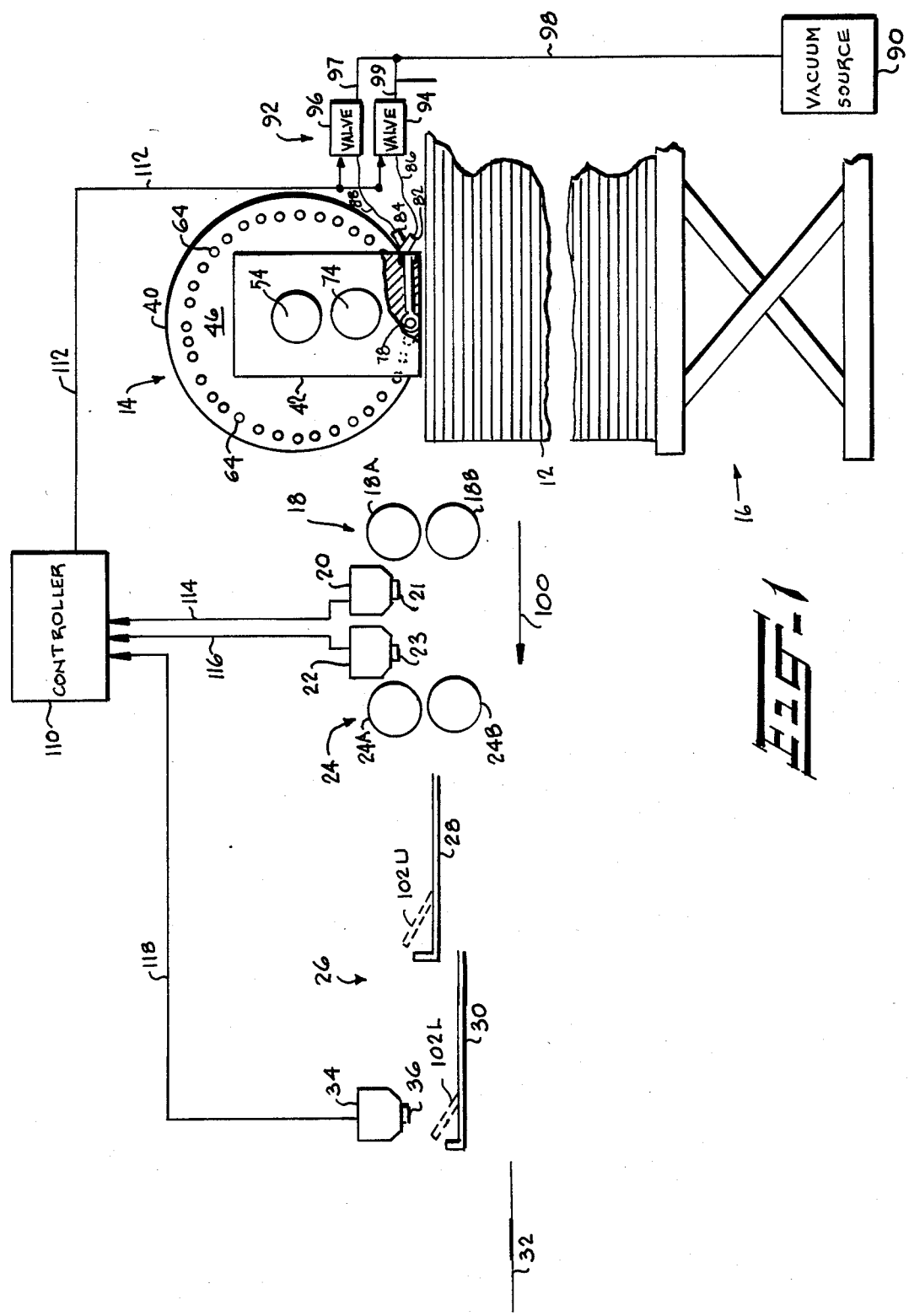

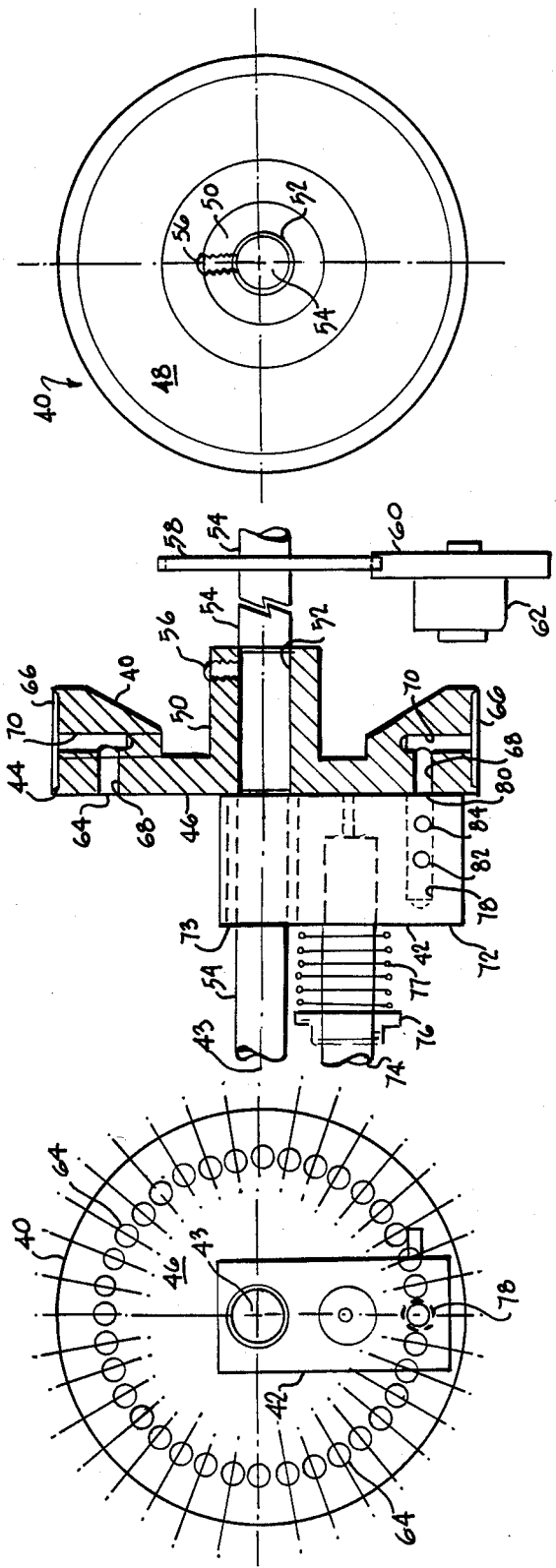

SHEET FEEDING APPARATUS AND METHOD

BACKGROUND

1. Field of the Invention

This invention pertains to sheet feeding apparatus and methods for operating the same, and particularly to sheet feeding apparatus for feeding sheets from the top of a stack using a rotating vacuum wheel.

2. Prior Art and Other Considerations

Rotating vacuum wheels have long been used to feed sheets from the top of a stack of sheets. Conventional rotating vacuum wheels are essentially disc-shaped and are driven to rotate about the central axis of the disc. A plurality of ports are provided at angular intervals along the circumferential surface of the disc. Each circumferential port communicates through passages in the interior of the disc with one or more corresponding side ports provided on a flat side surface of the disc. Since the vacuum wheel is mounted above the stack of sheets, means are provided for elevating the top of stack into close proximity with the circumference of the wheel at the point whereat the top of the stack is essentially tangent to the circumferential surface of the wheel.

Vacuum wheels are rotated for the feeding of each sheet. During each rotation of the vacuum wheel, when a circumferential port passes through the point of tangency, its corresponding side port is aligned with a port in a vacuum shoe. Alignment of the side port with the vacuum shoe port communicates a vacuum through the interior passages in the vacuum wheel to at least the corresponding circumferential port which is at the point of tangency, whereby the top sheet on the stack is sucked onto the rotating vacuum wheel circumference. As the vacuum wheel rotates, the vacuum-attracted sheet is advanced in a direction of conveyance toward a downstream processing station, receiving bin, or the like.

Rotating vacuum wheels have been operated both in a "stream" feed mode and a "demand" feed mode. According to prior art practice, during either the stream feed or the demand feed mode the vacuum wheel is rotated with the vacuum being all the time communicated to and through the vacuum wheel. In the stream mode the rotation of the vacuum wheel is controlled so that a predetermined interval consistently occurs between the feeding of consecutive sheets whereby the fed sheets are spaced apart from one another with respect to both time and distance along the direction of conveyance. In the demand mode selective rotation or indexing of the vacuum wheel occurs in response to an external signal whereby the feeding of consecutive sheets need not consistently be at a predetermined interval.

Rotating vacuum wheels have traditionally been used in environments in which essentially uniform sheets are fed from the top of a stack of sheets or in environments in which it is known in advance of feeding how unique sheets comprising the stack are related for grouping purposes to neighboring sheets in the stack. Rotating vacuum wheels have not proved advantageous in environments in which unique sheets are fed from a stack and in which it is not known until after feeding (by reading indicia by the sheet) how a sheet is related for grouping purposes to neighboring sheets in the stack.

In the above regard, many institutions mail financial account statements or billing statements to their numerous customers. Each customers statement may comprise a plurality of sheets, each sheet having unique billing information printed thereon and further bearing an indication to which customer's statement the sheet belongs. The number of sheets comprising the statement generally varies from customer to customer. The plurality of sheets comprising the financial statements are fed from a stack; grouped together; and, then subsequently associated with one or more inserts fed from insert stations to form a set of documents which is stuffed into an envelope. An example of a machine accomplishing such functions is described in U.S. Pat. No. 2,325,455 to Williams, which is incorporated herein by reference. In such a machine, sheets comprising the financial statements are fed from a stack or hopper in which the sheets comprising a first customer's statement are consecutively arranged and followed by the consecutive sheets comprising a second customer's statement, and so on with regard to further customers.

When sheets comprising a financial statement are fed and subsequently read to determine to what customer (i.e. group) they belong, there is no way to determine how many sheets comprise a customer's statement until a sheet comprising a subsequent customer's statement is fed and read. In such a situation, the sheet feeder must be controlled so that, once a subsequent customer's first sheet is fed, no further sheets belonging to the subsequent customer are fed until the sheets comprising the previous customer's statement have been properly grouped downstream. Therefore, the feeder must be responsive to control signals so that feeding can be promptly stopped and started, but responsive in a manner whereby the repeated stopping and starting of feeding does not interfere with a desired high rate of sheet feed required for optimum production.

Conventional rotating vacuum wheels have not proven effective in demand mode environments such as that described above. After each sheet is fed, the feeder must be stopped so that a reader can determine whether the just-fed sheet belongs with the previous customer's statement or whether it begins a subsequent customer's statement. Factors including momentum changes involved in the repeated starting and stopping of the rotational motion of a rotating vacuum wheel significantly slow down the feeding operation and greatly hamper production.

In view of the foregoing, it is an object of this invention to provide an efficient rotating vacuum wheel-type feeder and a method of operating the same.

An advantage of this invention is the provision of a rotating vacuum wheel feeder and method of operating the same which enables feeding at a rate of approximately twenty thousand sheets per hour.

A further advantage of this invention is the provision of a rotating vacuum wheel feeder and method of operating the same in which vacuum attraction is properly created for reducing the occurrence of "misses" and/or "doubles".

Yet another advantage of this invention is the provision of a feeding apparatus and method of operating the same wherein sheets are fed at a high rate of speed from the top of a stack for transport to an insertion machine.

SUMMARY

Sheets are fed from the top of a stack by a continuously rotating vacuum wheel. After the leading edge of a just-fed sheet is detected, a control circuit de-energizes valve means whereby the wheel is effectively disconnected from a source vacuum. Indicia borne on the just-fed sheet is read using a probe. If the indicia indicates that the just-fed sheet is related for grouping purposes to previously-fed sheets, the control circuit energizes valve means whereby vacuum is applied to the wheel for the feeding of a further sheet. If the indicia indicates that the just-fed, just-read sheet is not related to previously-fed sheets, the control circuit does not energize the valve means for the feeding of a further sheet until the control circuit receives an indication that all previously-fed sheets have been grouped and discharged onto an insert track.

In the course of developing the sheet feeder of the present invention the inventors discovered that a single valve having a particular orifice, the orifice being sized for communicating a vacuum having an attraction force sufficient for sucking the uppermost sheet from a stack and for imparting motion to the sheet whereby the sheet traveled a predetermined distance in a direction of conveyance, was energizable at such a slow rate (on the order of 50 milliseconds) that the feeder could not feed sheets at a desired commercial rate. To their surprise, the inventors further discovered that an equivalent attraction force could be exerted by two smaller valves connected in parallel between the source of vacuum and the vacuum wheel, and that the energization time of the two valves (on the order of 16 milliseconds) was substantially shorter than the single valve. The two parallel connected valves are, in a preferred embodiment, electrically-actuated solenoid valves having an orifice with an internal diameter on the order of 0.125 inch and an energization time on the order of about 16 milliseconds. Using two such valves connected in parallel the rotating vacuum wheel sheet feeder of the present invention feeds as many as 20,000 sheets per hour.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a schematic view of a sheet feeding and collecting system according to an embodiment of the invention;

FIG. 2 is a left side view of a rotating vacuum wheel and a vacuum transfer block according to an embodiment of the invention;

FIG. 3 is a sectional view of the apparatus of FIG. 2 taken along the line A—A;

FIG. 4 is a right side view of the apparatus of FIG. 2; and,

FIG. 5 is a partial bottom view of a rotating vacuum wheel of the embodiment of FIG. 2.

DETAILED DESCRIPTION OF THE DRAWINGS

FIG. 1 shows a sheet feeding and collecting system comprising a stack 12 of sheets; feeding means 14 for feeding sheets from stack 12; stack carrier means 16 for positioning the top of the stack 12 near the feeding means 14; first conveyor means 18 (comprising rollers 18A and 18B); first detection means 20 (including a photocell 21); reading means 22 (including a probe 23); second conveyor means 24 (comprising rollers 24A and 24B); collector means 26 (comprising an upper collector 28 and a lower collector 30); an insert track 32; and, second detection means 34 (including photocell 36).

The feeding means 14 comprises a rotating vacuum wheel 40 and a vacuum transfer block 42. The rotating vacuum wheel 40 is essentially disc-shaped and has a central axis 43. The rotating vacuum wheel 40 has a circumferential surface 44; a left side surface 46; and, right side surfaces 48. The left side surface 46 is an essentially flat circle.

A central portion of the disc-shaped rotating vacuum wheel 40 is formed as a hub 50. Hub 50 has a central aperture 52 extending therethrough which accommodates shaft 54 about which the wheel 40 rotates. The wheel 40 is locked onto shaft 54 by a fastener 56. Shaft 54 also has a gear 58 secured thereon in conventional fashion which meshes with a rotating drive gear 60 of a suitable electric motor 62. Motor 62 is mounted on an unillustrated frame assembly. The unillustrated frame assembly also has vertically extending walls with bushings therein for rotatably receiving the shaft 54.

The left side surface 46 of wheel 40 has a plurality of side ports 64 provided thereon. As seen in FIG. 2, 36 such side ports 64 are spaced at 10° intervals apart about the central axis 43 of wheel 40. The diameter of each side port 64 is approximately 0.250 inch.

The circumferential surface 44 has a plurality of circumferential ports 66 provided thereon and also spaced at 10° intervals apart about the central axis 43 in like manner as the side port 64. As seen in FIG. 5, in one embodiment each circumferential port 66 is oblong in shape having a major dimension (taken axially with respect to wheel 40) of approximately 1.380 inches and a minor dimension (taken about the circumferential surface of wheel 40) of approximately 0.312 inches. Each circumferential port 66 is recessed about 0.060 inches with respect to the circumference of the wheel 40.

Each side port 64 communicates with a corresponding circumferential port 66 through a horizontal passage 68 and a vertical passage 70. In the illustrated embodiment each horizontal passage 68 is 0.250 inches in diameter and 0.750 inches in length with respect to the axis 43. Each vertical passage is 0.250 inches in diameter and extends radially approximately 1.00 inches into the wheel 40 from its circumferential surface. Hence, corresponding horizontal passages 68 and vertical passages 70 intersect at right angles for facilitating communication between corresponding side ports 64 and circumferential ports 66.

The vacuum transfer block 42 comprises a housing 72 which is spring-biased by conventional means into position against the left side surface 46 of rotating vacuum wheel 40. An upper portion of housing 72 has a bushing 73 mounted therein to receive the shaft 54, shaft 54 extending through the block housing 71 in route to its termination at the unillustrated frame means. Shaft 54 is free to rotate about the axis 43, but the vacuum transfer block 42 does not rotate with the shaft inasmuch as it is stabilized by a locking stud 74. Locking stud 74 has a first end thereof anchored to the unillustrated frame means and a second end 75 received in a complementary aperture in the housing 71.

An intermediate portion of the stud 74 has a collar 76 securely mounted thereon. A helical compression spring 77 is captured between the collar 76 and the vacuum trasfer housing 72 to bias the housing 72 against the left side 46 of the rotating vacuum wheel 40. The force with which the vacuum transfer blocking housing 72 is biased against the wheel 40 is adjustable by loosening a fastener by which collar 76 is mounted on stud 74; sliding the collar 76 to a desired position; and, tightening the fastener.

The vacuum transfer block 42 has a vacuum transfer channel 78 formed therein which communicates with a vacuum transfer port 80. The vacuum transfer port 80 is positioned in a manner whereby the side ports 64 provided on vacuum wheel 40 sequentially register with the vacuum transfer port 80 as the vacuum wheel 40 is rotated. In the illustrated embodiment the diameter of the vacuum transfer port 80 is in a range of from about 0.375 inch to 0.440 inch. The vacuum transfer block 42 accommodates two fittings 82, 84 for allowing the vacuum transfer channel 78 to communicate with fluid lines 86 and 88, respectively. Each of the fittings 82, 84 have an internal diameter on the order of 0.125 inches.

The vacuum transfer block 42 is connected to a source of vacuum 90 through valve means 92. The valve means 92 comprises two electrically-actuated solenoid valves 94 and 96 connected in parallel intermediate the vacuum transfer block 42 and the source of vacuum 90. Valve 94 is connected by line 86 to fitting 82 and by fluidic lines 97 and 98 to the source 90. Valve 96 is connected by fluidic line 88 to fitting 84 and by fluidic lines 98 and 99 to the source 90. The valves 94, 96 are of the type having a 0.125 inch diameter orifice and a response time whereby the valves 94, 96 are energizable in less than about 25 milliseconds. In the preferred embodiment, the valves 94, 96 are energizable in about 16 milliseconds and deenergizable in about 5 milliseconds.

The rollers 18A, 18B comprising the first conveyor means 18 are situated about 4 inches downstream from stack 12 along a direction of conveyance (indicated by arrow 100). The rollers 18A, 18B are continuously driven by conventional drive means (not shown). The rollers 24A, 24B comprising a second drive means are situated about 3.5 inches further downstream in the direction of conveyance 100. Rollers 24A, 24B are driven by conventional drive means (also not shown) at the same rate as rollers 18A, 18B.

Positioned between the first conveyor means 18 and the second conveyor means 24 are photocell 21 and probe 23 associated with the first detecting means 20 and the reading means 22, respectively. Although the photocell 21 and probe 23 are shown sequentially positioned in FIG. 1 for the sake of clarity, in another embodiment the photocell 21 and probe 23 are positioned side-by-side and equally distanced from the first conveyor means 18.

Positioned downstream from the second conveyor means 24 is the collected means 26 comprising the first or upper collector 28 and the second or lower collector 30. The collector means 26 utilized herein is more fully described in U.S. Pat. No. 4,456,127 to Hams of which is incorporated herein by reference. The upper collector 28 and the lower collector 30 are arranged end-to-end so that all sheets fed from rollers 24A, 24B must serially pass through both the upper collector 28 and the lower collector 30. Each collector has associated therewith solenoid-actuated stop lifter fingers (shown by the broken lines 102U and 102L) for temporarily retaining therein, if necessary, one or more sheets until a time of proper release.

Downstream from the collector means 26 is an insert track which receives groups of sheets which are collected and discharged from the lower collector 30. The insert track 32 moves in a direction perpendicular to the plane of paper past a series of insert stations in a manner depicted in the incorporated U.S. Pat. No. 2,325,455 to Williams.

Positioned above the lower collector 30 is the photocell 36 associated with the second detection means 34. The photocell 36 determines when all the sheets in a group collected in the lower collector 30 have been discharged onto the insert track 32.

Valve means 92, first detection means 20, feeding means 22, and the second detection means 34 are all electrically connected to control means such as controller circuit 110. In this respect, the controller circuit 110 is connected to the valve means 92 by an electrical line 112; to the first detector means 20 by an electrical line 114; to the reading means 22 by an electrical line 116; and, to the second detector means 34 by an electrical line 118.

The controller circuit 110 includes (1) read information processing circuitry for determining whether a just-fed, just-read sheet is or is not related to previously-fed sheets and for generating a signal indicative thereof; (2) detection circuitry for generating, inter alia, a false signal on line 112 (to cause valve means 92 to disconnect the vacuum transfer block 42 from the vacuum source 90) when a signal from the first detection means 20 indicates that a leading edge of a just-fed sheet has passed under photocell 21; and, (3) discharge detection circuitry for generating a true signal on line 112 (to cause valve means 92 to connect the vacuum transfer block 42 to the vacuum source 90) when, although a just-read document is not related to previously fed sheets, the second direction means 34 indicates that sheets unrelated to the just-fed sheet have been properly collected and discharged onto insert track 32.

The component circuitry of the control means 110 can take many forms well known to the man skilled in the art. One embodiment of the read information processing circuitry is understood from the indicia reading circuitry disclosed in U.S. Pat. No. 4,442,347 to Hams (incorporated herein by reference) which reads indicia; determines whether a sheet is a first sheet of a group; and, provides a signal indicative thereof. In the same embodiment the feed detection and discharge detection circuits as well as circuitry for operating the collector means 26 are understood from the circuitry disclosed in the controller of U.S. Pat. No. 4,456,127 to Hams (incorporated herein by reference). In this regard, the incorporated '127 Hams patent discloses circuitry for use with an edge detection photocell assembly and a circuitry for use with a "fourth" photocell assembly positioned relative to the lower collector 30.

OPERATION

In operation, shaft 54 and the vacuum wheel 40 mounted thereon are driven by motor 62 to rotate continuously. In this respect, the vacuum wheel 40 rotates at a velocity whereby its circumferential speed is slightly lower (i.e. on the order of about 5 inches per second slower) than the circumferential velocity of the rollers comprising the first conveyor means 18 and the second conveyor means 24.

The stack 12 of sheets is properly elevated by stack carrier 16 so that the top sheet is proximate the bottom of the rotating vacuum wheel 40. The stack comprises groups of sheets, each group, for example, corresponding to a customer's multiple-sheet statement. For example, the top-most sheet is the first customer's first sheet, the second top-most sheet is the first customer's second sheet, the third top-most sheet is the second customer's first sheet, the fourth top-most sheet is the second customer's second sheet, the fifth top-most sheet is the second customer's third sheet, and so on. In other words, the stack 12 comprises a plurality of groups, with the sheets in each group being consecutively arranged.

To feed an uppermost sheet from the stack 12, the controller 110 applies a true signal on line 112 to energize the solenoid valves 94, 96. Each valve 94, 96 is energized in about 16 milliseconds whereby their 0.125 inch diameter orifice transmits vacuum from the source 90 through lines 86 and 88 to fittings 82 and 84 respectively, mounted on the vacuum transfer block 42. Thus, the valves 94 and 96 apply vacuum to the vacuum transfer chamber 78 and the vacuum transfer port 80.

When a side port 64 on vacuum wheel 40 registers with the vacuum transfer port 80, a vacuum is created in corresponding horizontal passage 68 in the corresponding vertical passage 70, as well as at the corresponding circumferential port 66. The vacuum created at the oblong circumferential port 66 is effectively on the order of 5 inches of mercury. The vacuum at the circumferential port 66 has a proper attraction force to suck only the uppermost sheet from the stack 12, whereby the feeding of "misses" or "doubles" does not become a problem. As the rotating vacuum wheel 40 continues to rotate, the uppermost sheet is propelled in the direction of conveyance 100 along a path between the rollers 18A, 18B.

After emerging from between the rollers 18A, 18B, the leading edge of the just-fed sheet is detected by photocell 21 of the first detecting means 20. The first detecting means 20 causes a true signal to be applied on line 114 to the controller 110. The controller uses the true signal on line 114 to flip the signal on line 112 from true to false. The false signal on line 112 causes the valves 94, 96 to be de-energized and at least temporarily disconnects the vacuum transfer block 42 from the vacuum source 90. With the valves 94, 96 de-energized, no further vacuum is supplied to the vacuum transfer block 42 and accordingly no further sheets are yet fed from the stack 12.

Essentially contemporaneously with the detection of the lead edge of the just-fed sheet, the probe 23 commences reading efforts to determine whether indicia borne on the just-fed sheet indicates that the just-fed sheet is related to previous sheets or whether the just-fed sheet is the beginning of a new group of sheets. The reading of the sheet occurs in the manner described in the already-incorporated U.S. Pat. No. 4,442,347 to Hams. In this respect, if the controller circuit 110 determines that the just-fed sheet is related to sheets previously fed and read, the controller 112 puts a true signal on line 112 to again energize the valves 94 and 96. Energization of the valves 24, 96 causes the vacuum transfer channel 78 in the block 42 to again be connected with the vacuum source 90, so that vacuum is again applied to the rotating wheel 40 and acts through an appropriate circumferential port 66 to feed another sheet from the top of stack 12.

In the feeding and reading of related sheets in the above-described manner, the read sheets are conveyed by roller 24A, 24B of the second conveyor means 24 into the collector means 26. In this respect, with the exception of the first sheet of a group, the sheets pass unhindered through the upper collector 28 and to the lower collector 30 where they are stopped by uplifted stop lifter fingers 102L. In this respect, all related sheets are permitted to pass through the upper collector 28 and into the lower collector 30 until all the sheets in a related group are collected in the lower collector 30. The already-incorporated U.S. Pat. No. 4,456,127 to Hams describes how the collector means 26 knows when all the sheets in a group are in the lower collector 30, and how the lower collector 30 then lowers its stop lifter fingers 102L to permit the completed group of sheets to be discharged onto the insert track 32.

If it is determined by the controller circuit 110 that a just-fed, just-read sheet is not related to the next preceeding sheet, the controller circuit 110 keeps the signal on line 112 false so that the valve means 92 remains de-energized. In this respect, if the first sheet of a new group has been read it is not appropriate to feed further sheets for the new group until all the sheets from the preceeding group have passed through the collector means 26 and have been discharged onto the insert track 32. Therefore, in accordance with the teachings of U.S. Pat. No. 4,456,127 to Hams, the controller circuit 110 causes the upper collector 28 to uplift its stop lifter fingers 102U to retain the just-fed, just-read sheet which is the first sheet of a new group. The upper collector 28 retains therein the first sheet of the new group until the second detector means 34 determines that the lower collector 30 has collected and discharged onto the insert track 32 all the sheets belonging to a previous group. When the controller circuit 110 receives conformation that all the sheets associated with the previous groups have been discharged onto the insert track 32, the controller circuit 110 permits the upper collector 28 to lower its stop lifter fingers 102U so that the first sheet of the new group may travel on to the lower collector 30 where it is retained. Essentially simultaneously, the controller circuit 110 puts a true signal on line 112 whereby the valves 94 and 96 connect the vacuum transfer channel 78 and the rotating vacuum wheel 40 to the source of vacuum 90 so that another sheet may be fed from the top of stack 12.

In the foregoing manner the rotating vacuum wheel 40 is used to feed sheets at a high rate from the top of the stack 12. In the described embodiment the rate of sheet feed is on the order of 20,000 sheets per hour. The vacuum wheel 40 continously rotates but a vacuum is selectively applied therethrough only when the feeding of a sheet is desired. After the first detection means 20 detects that a sheet has been fed, the controller circuit 110 de-energizes the valve means 92 so that further sheet feeding does not occur until the controller 110, operating in conjunction with the reading means 92, has read the just-fed sheet and determined whether the sheet is related to previously-fed sheets. If, after reading of the just-fed sheet, it is determined that the just-fed sheet is related to previous sheets (according to the read indicia or the like), the valve means 92 is again energized for the feeding of a further sheet. If a just-fed sheet is not related to previous sheets (i.e. is the first sheet of a new group of related sheets), the controller 110 does not allow the feeding of a further sheet (i.e. does not allow the energization of valve means 92 to connect the vacuum block 42 with the vacuum source 90) until all previous sheets unrelated to the just-fed sheet have been deposited on the insert track 32.

The high rate of sheet feed is facilitated by the usage of two small valves connected in parallel between the vacuum transfer block 42 and the vacuum source 90. These two valves, each having an orifice of about 0.125 inches in diameter, have an energization time on the order of about 16 milliseconds. The parallel connection of two smaller valves affords a faster response (i.e. energization time) than the use of the single valve adapted to apply the same degree of vacuum. In this respect, a 0.250 diameter orifice valve for applying the same vacuum has an energization time on the order of 50 milliseconds and thereby a response time considerably slower. Hence, the parallel usage of the smaller valves 94, 96 applies a vacuum (on the order of 5 inches of mercury) having an attraction force sufficient to suck only the uppermost sheet from stack 12 onto the vacuum wheel 40 and to impart motion to the sheet whereby the sheet travels approximately 4 inches in the direction of conveyance 100 to the nip of the rollers 18A, 18B. Further, valves 94 and 96 are quickly energizable and de-energizable whereby the valves may be energized at a rate of over 20,000 times per hour for the feeding of a sheet with each energization.

While the invention has been particularly shown and described with reference to the preferred embodiment thereof, it will be understood by those skilled in the art that various alterations in form and detail may be made therein without departing from the spirit and scope of the invention.

The embodiments of the invention in which an exclusive property or privilege is claimed are defined as follows:

1. Apparatus for feeding sheets from a stack of sheets, said apparatus comprising:

rotatable vacuum wheel means adapted to rotate about a central axis thereof, said vacuum wheel having a circumferential surface and a side surface, said circumferential surface having a plurality of circumferential ports therein and said side surface having a plurality of side ports therein, said vacuum wheel further having a plurality of passages provided therein for communicating corresponding ones of said circumferential ports and said side ports;

vacuum block means connectable to a source of vacuum, said vacuum block means having a port positioned in a manner whereby said side ports provided on said vacuum wheel means sequentially register with said vacuum block port as said vacuum wheel means is rotated, said registry of said vacuum block port and said side ports facilitating the communicating of a vacuum to corresponding circumferential ports as said corresponding circumferential ports are rotated into proximity with said stack;

means for orienting said stack in proximity to said rotatable vacuum wheel means;

drive means for rotating said rotatable vacuum wheel in an essentially continuous manner;

valve means for (1) connecting said vacuum block means to said source of vacuum when a sheet is to be fed from a stack, thereby permitting said vacuum to be communicated through said vacuum wheel in a manner whereby a sheet is vacuum-attracted to said rotating vacuum wheel and imparted motion in a direction of conveyance, and for (2) disconnecting said vacuum block means from said source of vacuum after a sheet is fed from said stack, wherein said valve means comprises at least two valves connected in parallel intermediate said vacuum block means and said source of vacuum, said valves being actuatable to collectively transfer vacuum to said circumferential ports of said rotating vacuum wheel in a manner whereby the vacuum-attractive force per square unit area existing at said circumferential ports is sufficient to attract thereto a sheet from said stack and to enable said rotating vacuum wheel to impart motion to said sheet for moving said sheet for at least a predetermined distance in said direction of conveyance.

2. The apparatus of claim 1, wherein said valves each comprise electrically-actuatable solenoid valves, each valve having a vacuum transmitting orifice on the order of 0.125 inch in diameter and an energization time at least as fast as on the order of 16 milliseconds.

3. Apparatus for feeding sheets from a stack of sheets, said apparatus comprising:

rotatable vacuum wheel means adapted to rotate about a central axis thereof, said vacuum wheel having a circumferential surface and a side surface, said circumferential surface having a plurality of circumferential ports therein and said side surfcae having a plurality of side ports therein, said vacuum wheel further having a plurality of passages provided therein for communicating corresponding ones of said circumferential ports and said side ports;

vacuum block means connectable to a source of vacuum, said vacuum block means having a port positioned in a manner whereby said side ports provided on said vacuum wheel means sequentially register with said vacuum block port as said vacuum wheel means is rotated, said registry of said vacuum block port and said side ports facilitating the communicating of a vacuum to corresponding circumferential ports as said corresponding circumferential ports are rotated into proximity with said stack;

means for orienting said stack in proximity to said rotatable vacuum wheel means;

drive means for rotating said rotatable vacuum wheel in an essentially continuous manner;

valve means for (1) connecting said vacuum block means to said source of vacuum when a sheet is to be fed from a stack, thereby permitting said vacuum to be communicated through said vacuum wheel in a manner whereby a sheet is vacuum-attracted to said rotating vacuum wheel and imparted motion in a direction of conveyance, and for (2) disconnecting said vacuum block means from said source of vacuum after a sheet is fed from said stack;

reading means positioned downstream along said direction of conveyance from said stack, said reading means being positioned to read indicia on sheets conveyed thereby and to generate a signal in accordance therewith; and, control means to which said valve means and said reading means are operatively connected, said control means being connected to said reading means for receiving said signal generated by said reading means and for using said signal to determine whether a just-fed sheet read by said reading means is related to a previously-fed sheet, said control means being connected to said valve means for connecting said vacuum block means to said source of vacuum when a just-fed sheet read by said reading means is related to a previously-fed sheet.

4. The apparatus of claim 3, further comprising:
first detection means for detecting when a sheet fed from said stack has travelled a predetermined distance along said direction of conveyance, said first detection means being operatively connected to said control means whereby said control means causes said valve means to disconnect said vacuum block means from said source of vacuum when a sheet fed from said stack has travelled said predetermined distance along said direction of conveyance.

5. The apparatus of claim 4, further comprising:
second detection means positioned downstream from said reading means and said first detection means with respect to said direction of conveyance, said second detection means means being adapted to detect the complete collection of previously-fed sheets which are unrelated to a just-fed, just-read sheet and to provide a signal indicative of said complete collection, said second detection means being operatively connected to said control means whereby upon said complete collection said control means causes said valve means to connect said vacuum block means to said source of vacuum for the feeding of another sheet from said stack.

6. The apparatus of claim 3, wherein said valve means comprises:
at least two valves connected in parallel intermediate said vacuum block means and said source of vacuum, each of said valves being actuatable to collectively transfer vacuum to said circumferential ports of said rotating vacuum wheel in a manner whereby the vacuum-attractive force per square unit area existing at said circumferential ports is sufficient to attract thereto a sheet from said stack and to enable said rotating vacuum wheel to impart motion to said sheet for moving said sheet for at least a predetermined distance in said direction of conveyance.

7. The apparatus of claim 6, wherein said valves each comprise electrically-actuatable solenoid valves, each valve having a vacuum transmitting orifice on the order of 0.125 inch in diameter and an energization time at least as fast as on the order of 16 milliseconds.

8. A method of feeding sheets from a stack of sheets, said method comprising the steps of:
using rotatable vacuum wheel means adapted to rotate about a central axis thereof, said vacuum wheel having a circumferential surface and a side surface, said circumferential surface having a plurality of circumferential ports therein and said side surface having a plurality of side ports therein, said vacuum wheel further having a plurality of passages provided therein for communicating corresponding ones of said circumferential ports and said side ports;

rotating said rotatable vacuum wheel in an essentially continuous manner whereby said side ports provided on said vacuum wheel means sequentially register with a port of said vacuum block means as said vacuum wheel means is rotated, said registry of said vacuum block port and said side ports facilitating the communicating of a source of vacuum to corresponding circumferential ports when each of said corresponding circumferential ports are rotated into proximity with said stack; and, using valve means for (1) connecting said vacuum block means to said source of vacuum when a sheet is to be fed from said stack, thereby permitting said vacuum to be communicated through said vacuum wheel in a manner whereby a sheet is vacuum-attracted to said rotating vacuum wheel and imparted motion in a direction of conveyance, and for (2) disconnecting said vacuum block means from said source of vacuum after a sheet is fed from said stack, wherein said step of using said valve means comprises using at least two valves connected in parallel intermediate said vacuum block means and said source of vacuum, said valves being actuatable to collectively transfer vacuum to said circumferential ports of said rotating vacuum wheel in a manner whereby the vacuum-attractive force per square unit area existing at said circumferential ports is sufficient to attract thereto a sheet from said stack and to enable said rotating vacuum wheel to impart motion to said sheet for moving said sheet for at least a predetermined distance in said direction of conveyance.

9. The method of claim 8, wherein the step of using two valves comprises the step of using electrically-actuatable solenoid valves, each valve having a vacuum transmitting orifice on the order of $\frac{1}{8}$ inch in diameter and an energization time at least as fast as on the order of 16 milliseconds.

10. A method of feeding sheets from a stack of sheets, said method comprising the steps of:
using rotatable vacuum wheel means adapted to rotate about a central axis thereof, said vacuum wheel having a circumferential surface and a side surface, said circumferential surface having a plurality of circumferential ports therein and said side surface having a plurality of side ports therein, said vacuum wheel further having a plurality of passages provided therein for communicating corresponding ones of said circumferential ports and said side ports;

rotating said rotatable vacuum wheel in an essentially continuous manner whereby said side ports provided on said vacuum wheel means sequentially register with a port of said vacuum block means as said vacuum wheel means is rotated, said registry of said vacuum block port and said side ports facilitating the communicating of a source of vacuum to corresponding circumferential ports when each of said corresponding circumferential ports are rotated into proximity with said stack;

using valve means for (1) connecting said vacuum block means to said source of vacuum when a sheet is to be fed from said stack, thereby permitting said vacuum to be communicated through said vacuum wheel in a manner whereby a sheet is vacuum-attracted to said rotating vacuum wheel and imparted motion in a direction of conveyance, and for (2) disconnecting said vacuum block means from said source of vacuum after a sheet is fed from said stack;

positioning reading means downstream along said direction of conveyance from said stack, said reading means being positioned to read indicia on sheets conveyed thereby and to generate a signal in accordance therewith; and, using control means to which said valve means and said reading means are operatively connected, said control means being connected to said reading means for receiving said signal generated by said reading means and for using said signal to determine whether a just-fed sheet read by said reading means is related to a previously-fed sheet, said control means being connected to said valve means for connecting said vacuum block means to said source of vacuum when a just-fed sheet read by said reading means is related to a previously-fed sheet.

11. The method of claim 10, further comprising the step of:
using first detection means to detect when a sheet fed from said stack has travelled a predetermined distance along said direction of conveyance, said first detection means being operatively connected to said control means whereby said control means causes said valve means to disconnect said vacuum block means from said source of vacuum when a sheet fed from said stack has travelled said predetermined distance along said direction of conveyance.

12. The apparatus of claim 11, further comprising the step of:
using second detection means downsteam from said reading means and said first detection means with respect to said direction of conveyance, said second detection means means being adapted to detect the complete collection of previously-fed sheets which are unrelated to a just-fed, just-read sheet and to provide a signal indicative of said complete collection, said second detection means being operatively connected to said control means whereby upon said complete collection said control means causes said valve means to connect said vacuum block means to said source of vacuum for the feeding of another sheet from said stack.

13. The method of claim 10, wherein said step of using said valve means comprises the step of:
using at least two valves connected in parallel intermediate said vacuum block means and said source of vacuum, each of said valves being actuatable to collectively transfer vacuum to said circumferential ports of said rotating vacuum wheel in a manner whereby the vacuum-attractive force per square unit area existing at said circumferential ports is sufficient to attract thereto a sheet from said stack and to enable said rotating vacuum wheel to impart motion to said sheet for moving said sheet for at least a predetermined distance in said direction of conveyance.

14. The method of claim 13, wherein said valve each comprise electrically-actuatable solenoid valves, each valve having a vacuum transmitting orifice on the order of 0.125 inch in diameter and an energization time at least as fast as on the order of 16 milliseconds.

* * * * *